July 22, 1969     W. B. NICHOLS     3,456,968
SPLICE CONNECTOR ASSEMBLY
Filed Sept. 5, 1967
FIG.1
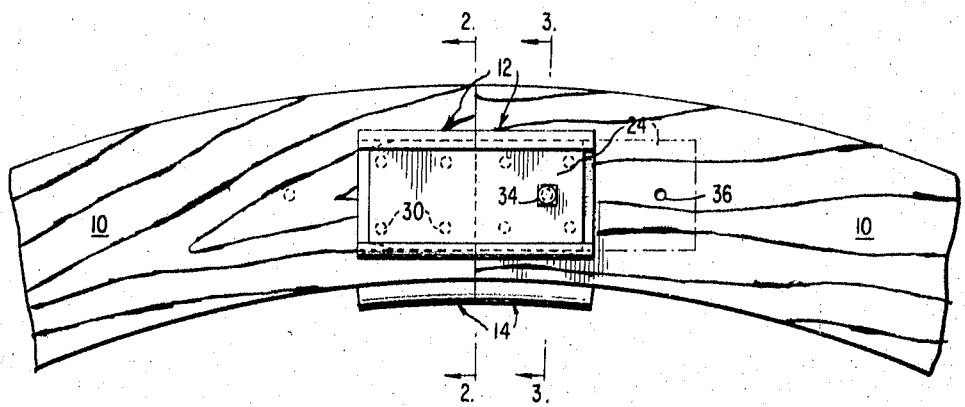
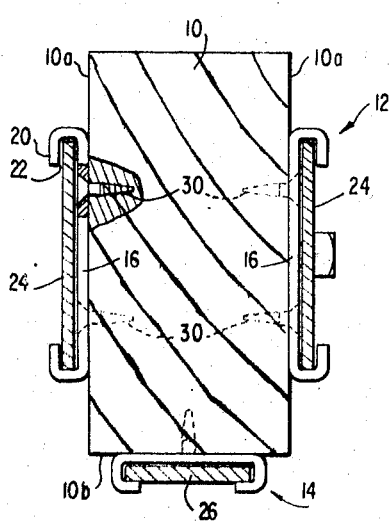
FIG.2
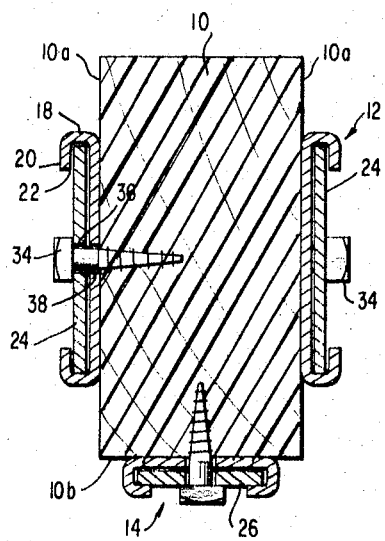
FIG.3
INVENTOR
WALTER B. NICHOLS
BY Brown, Schuyler & Beveridge
ATTORNEYS ary along lines 3—3 of FIG. 1.

United States Patent Office 3,456,968
Patented July 22, 1969

3,456,968
SPLICE CONNECTOR ASSEMBLY
Walter B. Nichols, 77 Lounsbury Road,
Trumbull, Conn. 06611
Filed Sept. 5, 1967, Ser. No. 665,354
Int. Cl. F16b 7/00, 5/00, 9/00
U.S. Cl. 287—20.92
6 Claims

ABSTRACT OF THE DISCLOSURE

A pair of channel-shaped elements fixed respectively to the faces of two structural members to be joined and having inturned side portions defining aligned passages receiving a slide plate that overlaps the channel elements to interconnect the same. In fabrication the channel elements are permanently secured to the structural members with the slide plate received in one of the channel passages so that for assembly, the slide plate may be moved to extended position in the other channel passage. A bolt received through apertures in the slide plate and one of the channel elements positions the slide plate against movement.

SUMMARY OF INVENTION AND OBJECTS

This invention relates to splice connectors and a method for joining two structural members such as in a building or the like. Although the present invention is particularly suitable for joining heavy prefabricated structural members such as the arched ribs disclosed in my copending U.S. Patent application Ser. No. 631,799, filed Apr. 18, 1967, it will be appreciated that the concepts and structure of the present invention may be applied in other constructions.

In the field of portable, prefabricated building construction, speed and ease of assembly as well as disassembly are important goals. With respect to the splicing or joining of heavy structural members in a prefabricated, portable building, the present invention seeks to obtain the aforementioned goals through a novel method as well as novel splice connectors employed to implement the method. To achieve the foregoing goals without excessively increasing the cost of construction is another object of the present invention. A further object is to provide a splice joint which is durable and reliable.

In one embodiment, the above objects are achieved by permanently securing during fabrication, a pair of generally channel shaped elements to the end sections of two structural members to be joined. The opposite sides of the channel elements project outwardly and then inwardly to define longitudinal passages dimensioned to slidably receive a slide plate that overlaps both of the channel elements to interconnect the same upon assembly in the field. During fabrication in the shop, however, the slide plate is positioned in only one of the channel elements. To effect a splice in the field, the slide plate is extended from a retracted position beyond the end of the associated structural member into the passage of the other channel element to thus overlap and interconnect the channel elements and their associated structural members. The depth of the passages in the channel elements is slightly larger than the thickness of the slide plate to allow the latter to slide but to prevent lateral movement. Additionally, the slide plate is held against movement in the channel elements by a bolt inserted through aligned transverse apertures in the slide plate and one of the channel elements. Depending upon the size of the structural members to be joined as well as the required strength of the joint, additional pairs of channel elements may be applied to the other faces of the structural members to be interconnected by slide plates in the same manner.

Other objects and advantages of the present invention will be evident from the following more detailed description taken in conjunction with the drawings in which:

FIG. 1 is a side view of two arched structural members, with portions broken away, incorporating one embodiment of the present invention;

FIG. 2 is an enlarged cross-sectional view taken generally along lines 2—2 of FIG. 1; and FIG. 3 is an enlarged cross-sectional view taken generally along lines 3—3 of FIG. 1.

DETAILED DESCRIPTION

Referring now to the drawings in detail, FIG. 1 illustrates a splice connection between two structural members 10 shown as two portions of a wooden arch, in accordance with one embodiment of the present invention. In the particular form illustrated, the splice connection is made on the opposite sides 10a and on the bottom faces 10b of structural members 10 by means of channels associated in pairs generally designated 12 and 14.

The channels may be made from material of suitable strength such as structural steel. Each channel 12 includes a flat rectangular base 16, and inturned continuous side portions projecting outwardly at 18 and inwardly at 20 to define a passage 22 extending longitudinally between the opposite ends of the channel. Passage 22 is dimensioned to slidably receive a slide plate 24 which may also be made from structural steel and with a rectangular shape of sufficient longitudinal dimension to overlap the channels as shown in FIG. 1. The thickness of slide plate 24 is slightly less than the depth of passage 22 so as to be slidable through the passage during assembly and disassembly. However, minimum clearance is provided between slide plate 24 and the inturned side portions 18, 20 of the channels, to prevent lateral movement of the slide plate while in the channels.

Channels 14 may have the same shape as channels 12 however in the shown embodiment they are smaller in dimension. A slide plate 26 similar to slide plate 24 interconnects channels 14 to form a joint at lower faces 10b of the structural members.

During fabrication of structural members 10 in the shop for example, channels 12 and 14 are permanently attached to the structural members such as by screws 30 received through apertures 32 in the channel bases 16. The channels are positioned at the ends of the structural members 10 so that when the structural members are butted together, the channels will be in alignment to form in effect continuous channel passages 22 for receiving the slide plates 24 and 26 as described above.

Prior to assembly in the field, slide plates 24 and 25 are stored in retracted position in one of the channels of each associated pair. To maintain the slide plate in the storage position against accidental loss or movement, a screw 34 or any other suitable stud or pin may be inserted through an aperture 36 in the slide plate and into the structural member. The foregoing may be effected during fabrication in the shop.

To assemble structural members 10 in the field, they are placed into abutting engagement as shown in FIG. 1, screw 34 is removed from aperture 36 and then the slide plate is extended from the retracted position shown in phantom in FIG. 1 to the extended position in the other associated channel as shown by the full lines in FIG. 1. Screw 34 is then reinserted through aperture 36 and through an aperture 38 provided in the base and finally into the structural members. This retains the slide plate against longitudinal movement in the channel passages 22. In the specific embodiment shown, the foregoing assembly process is repeated with respect to the three pairs of channels.

In order to disassemble the structural members, screws 34 are removed from the channels, and the slide plates are then withdrawn into the retracted position to disconnect the channels. Screws 34 may be reinserted through aperture 36 and into the structural members, to maintain the slide plates in retracted position for transportation or other storage purposes.

In addition to the advantages described above, it will be seen that the splice connector assembly of the present invention, eliminates much of the work, and skill heretofore required by conventional splicing methods and devices. At the same time the splice connector assembly of the present invention will provide a reliable splice joint which is also economically feasible.

Modifications and adaptations of the present invention readily apparent from the foregoing description and associated drawings, although not specifically mentioned herein, will nevertheless be included within the scope of the present invention as indicated in the appended claims.

I claim:

1. A splice joint comprising in combination, two structural members for building construction having their ends in substantial abutting engagement and a pair of aligned side faces, a pair of channel elements formed separately from said structural members and each including a base and inturned portions extending along the opposite sides of the base to define a channel passage, said inturned portions including first sections extending away from said base and second sections extending inwardly from said first sections to overly portions of said base, said channel elements being fixed to said faces of said structural members with the bases of the channel elements engaged against said faces of the structural members and with the passages of said channel elements in axial alignment, said passages facing away from said structural members, a slide plate slidably received in both of said channel passages to interconnect said structural members, said inturned portions partially overlying said side plate to retain the slide plate in said passages, and removable means securing said slide plate in said channel passages against movement.

2. The splice joint defined in claim 1 wherein said structural members are formed from wood and wherein said channel elements and side plates are formed from a high strength metal.

3. The splice joint defined in claim 2 wherein said structural members form part of a structural arch.

4. The splice joint defined in claim 1 wherein said structural members have aligned bottom faces terminating at the juncture between said structural members, and wherein there is provided a second pair of channel elements fixed to said bottom surfaces with their passages in alignment, and a second slide plate received in the passages of said second pair of channel elements, and removable means securing said second slide plate in position.

5. The splice joint defined in claim 1 wherein said removable means securing said slide plate in position includes a pair of aligned apertures extending through the slide plate and the underlying base of one of the channel elements, and a fastener extending through said apertures.

6. The splice joint defined in claim 4 wherein said structural members have a pair of aligned second side faces opposite said first defined side faces, and wherein there is provided a third pair of channel elements fixed to said second side faces respectively, a third slide plate in the passages of said third channel elements and removable means securing said third slide plate in position.

References Cited

UNITED STATES PATENTS

| 146,207 | 1/1874 | Schneider. | |
| 200,013 | 2/1878 | Allen | 238—246 |
| 320,079 | 6/1885 | Martin | 287—189.36 |
| 791,804 | 6/1905 | Mellinger | 238—247 |
| 1,257,945 | 2/1918 | Lee | 287—189.36 |

FOREIGN PATENTS

| 757,262 | 9/1956 | Great Britain. |

CARL W. TOMLIN, Primary Examiner

R. S. BRITTS, Assistant Examiner